United States Patent
Enomoto

(10) Patent No.: US 9,538,034 B2
(45) Date of Patent: Jan. 3, 2017

(54) IMAGE FORMING APPARATUS, IMAGE FORMING METHOD, AND RECORDING MEDIUM THAT FACILITATE MANAGEMENT OF BLANK SHEETS FOR PREVENTING LEAKAGE OF CONFIDENTIAL INFORMATION

(71) Applicant: Kyocera Document Solutions Inc., Osaka (JP)

(72) Inventor: Kyozo Enomoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/555,588

(22) Filed: Nov. 27, 2014

(65) Prior Publication Data

US 2015/0146236 A1 May 28, 2015

(30) Foreign Application Priority Data

Nov. 27, 2013 (JP) ................................. 2013-245142

(51) Int. Cl.
*H04N 1/00* (2006.01)

(52) U.S. Cl.
CPC ...... *H04N 1/00726* (2013.01); *H04N 1/00777* (2013.01); *H04N 1/00803* (2013.01)

(58) Field of Classification Search
None
See application file for complete search history.

(56) References Cited

U.S. PATENT DOCUMENTS

| | | | | |
|---|---|---|---|---|
| 7,613,773 | B2 * | 11/2009 | Watt | 709/205 |
| 8,145,609 | B2 * | 3/2012 | Saito | 707/697 |
| 8,593,661 | B2 * | 11/2013 | Shimizu | 358/1.15 |
| 2010/0251110 | A1 * | 9/2010 | Mitani | G06F 17/212 715/273 |

FOREIGN PATENT DOCUMENTS

JP 2008-225928 A 9/2008

OTHER PUBLICATIONS

Machine translation of Japanese Publ. No. 2008-225928 to Miki, published Sep. 2008.*

* cited by examiner

*Primary Examiner* — Paul F Payer
(74) *Attorney, Agent, or Firm* — James Judge

(57) ABSTRACT

An image forming apparatus includes an image-log creation unit, a document blank sheet page skip scan function setting unit, a blank sheet page image registration setting unit, and a blank sheet page image image-log output setting unit. The image-log creation unit creates an image of an image-log from image attribute information and image data of a read document. The document blank sheet page skip scan function setting unit sets whether to use a skip scan function of a blank sheet page of a document. The blank sheet page image registration setting unit sets whether to register a blank sheet page image of the document. The blank sheet page image image-log output setting unit sets whether to output an image-log of the blank sheet page images.

4 Claims, 7 Drawing Sheets

| | k1 | k2 | k3 | k4 | k5 |
|---|---|---|---|---|---|
| | Document blank sheet page scan setting (with/without skip scan function) | Blank sheet page image registration setting (with/without registration) | Blank sheet page image registration process | Blank sheet page image image-log output setting (with/without output) | Blank sheet page image image-log output process |
| Without skip scan function | | With registration | Upon detection of blank sheet page, blank sheet page image is registered with image attribute information and image data. | With output | Blank sheet page image is output to image-log. |
| | | | | Without output | Blank sheet page image is not output to image-log. |
| | | Without registration | Upon detection of blank sheet page, blank sheet page image is registered with image attribute information but is not registered with image data. | With output | Blank sheet page image is output to image-log. |
| | | | | Without output | Blank sheet page image is not output to image-log. |
| With skip scan function | | — | Since blank sheet page is not scanned, blank sheet page image is not registered with image attribute information and image data. | — | Blank sheet page image is not output to image-log. |

FIG. 3

| k1: Document blank sheet page scan setting (with/without skip scan function) | k2: Blank sheet page image registration setting (with/without registration) | k3: Blank sheet page image registration process | k4: Blank sheet page image-log output setting (with/without output) | k5: Blank sheet page image image-log output process |
|---|---|---|---|---|
| Without skip scan function | With registration | Upon detection of blank sheet page, blank sheet page image is registered with image attribute information and image data. | With output | Blank sheet page image is output to image-log. |
| Without skip scan function | With registration | Upon detection of blank sheet page, blank sheet page image is registered with image attribute information and image data. | Without output | Blank sheet page image is not output to image-log. |
| Without skip scan function | Without registration | Upon detection of blank sheet page, blank sheet page image is registered with image attribute information but is not registered with image data. | With output | Blank sheet page image is output to image-log. |
| Without skip scan function | Without registration | Upon detection of blank sheet page, blank sheet page image is registered with image attribute information but is not registered with image data. | Without output | Blank sheet page image is not output to image-log. |
| With skip scan function | — | Since blank sheet page is not scanned, blank sheet page image is not registered with image attribute information and image data. | — | Blank sheet page image is not output to image-log. |

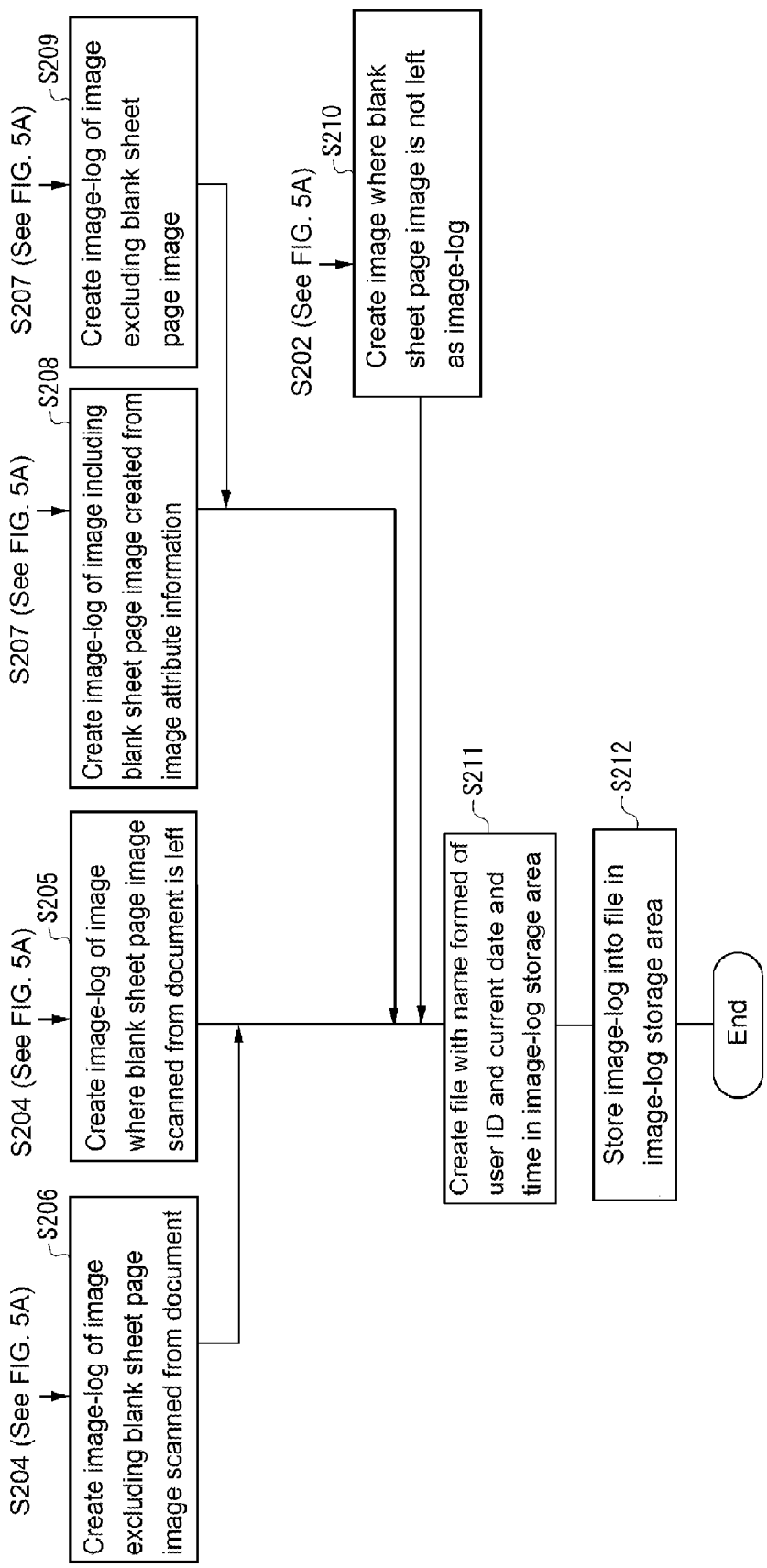

IMAGE FORMING APPARATUS, IMAGE FORMING METHOD, AND RECORDING MEDIUM THAT FACILITATE MANAGEMENT OF BLANK SHEETS FOR PREVENTING LEAKAGE OF CONFIDENTIAL INFORMATION

INCORPORATION BY REFERENCE

This application is based upon, and claims the benefit of priority from, corresponding Japanese Patent Application No. 2013-245142 filed in the Japan Patent Office on Nov. 27, 2013, the entire contents of which are incorporated herein by reference.

BACKGROUND

Unless otherwise indicated herein, the description in this section is not prior art to the claims in this application and is not admitted to be prior art by inclusion in this section.

An image forming apparatus, such as a multifunction peripheral, has a function to read a document with a scanner and to convert the scanned data into image data. Thus, the image forming apparatus can easily convert the read document into image data. Accordingly, even if the document contains confidential information, a user can copy the image data on the document to a paper sheet, store the image data in an external memory, or transmit the image data to another apparatus. In view of this, a leakage of the image data on the document describing the confidential information is prevented as follows. The image forming apparatus or a management server, which is connected to the image forming apparatus over a network, stores the image data on all the read documents as an image-log. It is confirmed whether or not the stored image data contains the confidential information. Additionally, the user is notified that the read image data on the read document is under surveillance. However, to store the image data on the all read documents, the image forming apparatus and the management server require a storage device such as a large-capacity hard disk. In view of this, a measure to save the storage capacity for the image data has been taken. For example, when a page of a blank sheet document is detected, a known image processing apparatus can select any of the following processes to ensure saving the storage capacity for the image data.

(1) A process that reduces the blank sheet document to a minimum image and includes the blank sheet document to log image data,
(2) A process that creates the log image data excluding the blank sheet document,
(3) A process that adds text data such as a "blank sheet" to the blank sheet document reduced to the minimum image, and
(4) A process that creates the image data including the blank sheet document.

SUMMARY

An image forming apparatus according to one aspect of the disclosure includes an image-log creation unit, a document blank sheet page skip scan function setting unit, a blank sheet page image registration setting unit, and a blank sheet page image image-log output setting unit. The image-log creation unit creates an image of an image-log from image attribute information and image data of a read document. The document blank sheet page skip scan function setting unit sets whether to use a skip scan function of a blank sheet page of a document. The blank sheet page image registration setting unit sets whether to register a blank sheet page image of the document. The blank sheet page image image-log output setting unit sets whether to output an image-log of the blank sheet page images.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3 is a table illustrating a relationship between settings and processes until a blank sheet page image created through scanning a blank sheet page of a document is output to an image-log according to the one embodiment.

FIGS. 5A and 5B illustrate a flowchart of an image-log creation storage process according to the one embodiment.

DETAILED DESCRIPTION

Figure 1:
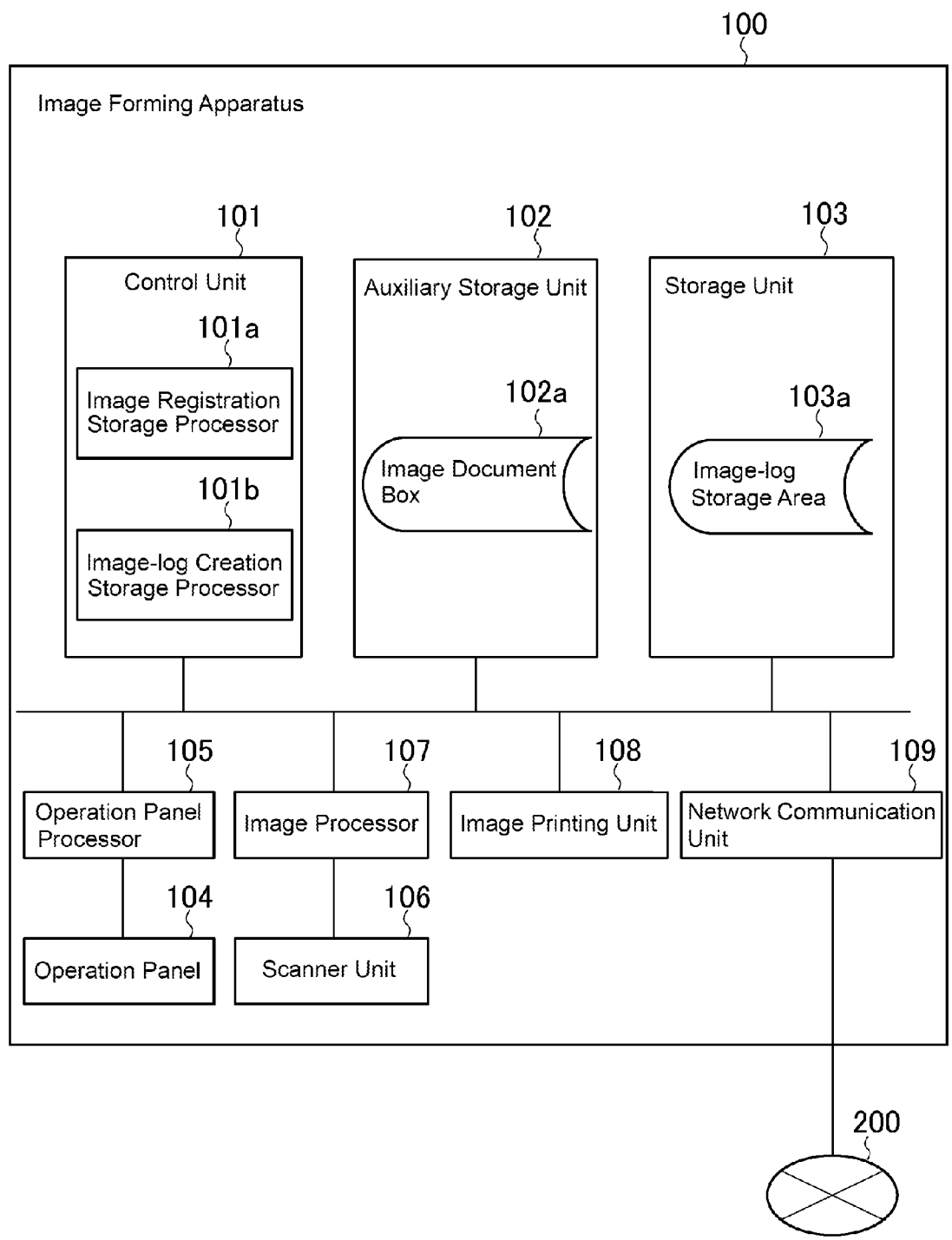
FIG. 1 illustrates a functional block configuration of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to the drawings.

The following describes a functional configuration of an image forming apparatus 100 according to the embodiment with reference to FIG. 1. The image forming apparatus 100 illustrated in FIG. 1 includes a control unit 101, an auxiliary storage unit 102, a storage unit 103, an operation panel 104, an operation panel processor 105, a scanner unit 106, an image processor 107, an image printing unit 108, and a network communication unit 109. These units are connected via a bus or a similar system. The control unit 101 includes an image registration storage processor 101a and an image-log creation storage processor 101b. The auxiliary storage unit 102 includes an image document box 102a. The storage unit 103 includes an image-log storage area 103a.

The control unit 101 includes a main storage unit such as a RAM and a ROM and a Micro Processing Unit (MPU) and a Central Processing Unit (CPU). The control unit 101 controls the overall image forming apparatus 100 including various I/Os, an interface such as a Universal Serial Bus (USB), a bus controller, and a similar device. The control unit 101 includes the image registration storage processor 101a and the image-log creation storage processor 101b. The image registration storage processor 101a stores image attribute information and image data created by reading a document (hereinafter referred to as "scan") in the image document box 102a. The image-log creation storage processor 101b creates an image-log from the image attribute information and the image data and stores the image-log to the image-log storage area 103a. To the image attribute information, information such as an image quality, a resolution, a size, a rotation direction, and a color of the image data, a presence of a blank sheet page, and a page position (for example, the page number) of the blank sheet page is set if the blank sheet page is present. Details of the image registration storage processor 101a and the image-log creation storage processor 101b will be described later.

The auxiliary storage unit 102 is a flash memory where a program and data for a process performed by the control unit 101 are stored. The image registration storage processor 101a stores the image attribute information and the image data to the image document box 102a. A directory structure of the image document box 102a will be described later.

The storage unit 103 is a storage device, such as a hard disk drive, that stores data and a program. The image-log creation storage processor 101b stores the image data as the image-log in the image-log storage area 103a.

The operation panel 104 accepts an operation and a setting by an administrator or a user. The operation panel 104 displays an operation item of a function and a screen of the setting item of the image forming apparatus 100 and a message to be notified to the administrator or the user.

The operation panel processor 105 performs: a process that displays the screen of the operation item of the function of the image forming apparatus 100 on the operation panel 104, a process that inputs an operation and a setting by the administrator or the user input from the operation panel 104, and a process that displays a message to notify the administrator or the user of a state of the image forming apparatus 100 on the operation panel 104.

The scanner unit 106 scans a document set on a document platen of the image forming apparatus 100 to digitalize the document. Inputting a scan request causes the scanner unit 106 to scan the document on the document platen. The scanner unit 106 outputs data where the document is digitalized (hereinafter referred to as "digital data") to the image processor 107. When a scan setting including the blank sheet page (without a skip scan function) is configured, the scanner unit 106 leaves the blank sheet page of the document as the image data. When the scan setting excluding the blank sheet page (with the skip scan function) is configured, the scanner unit 106 does not leave the blank sheet page of the document as the image data.

When inputting an image creation request, the image processor 107 inputs the digital data of the document from the scanner unit 106. The image processor 107 creates the image attribute information from the digital data. Additionally, the image processor 107 converts the text information of the digital data into bitmap graphics (data in raster format) to create imaged (rasterized) image data of the document. When a setting to register a blank sheet page image is configured and the image processor 107 detects the blank sheet page, the image processor 107 registers information on the blank sheet page image with the image attribute information and registers the blank sheet page image with the image data. When the setting not to register the blank sheet page image is configured and the image processor 107 detects the blank sheet page, the image processor 107 registers the information on the blank sheet page image with the image attribute information but does not register the blank sheet page image with the image data.

When inputting a print request from the user from the operation panel processor 105, the image printing unit 108 prints the image data on the document with the image attribute information and the image data of the document, which are stored in the image document box 102a, to a paper sheet.

The network communication unit 109 includes an attachable/removable LAN interface for connection to a network 200. The LAN interface includes a network unit that performs intelligent transmission and reception in various network protocols, such as TCP/IP, AppleTalk, and SMB.

Figure 2:
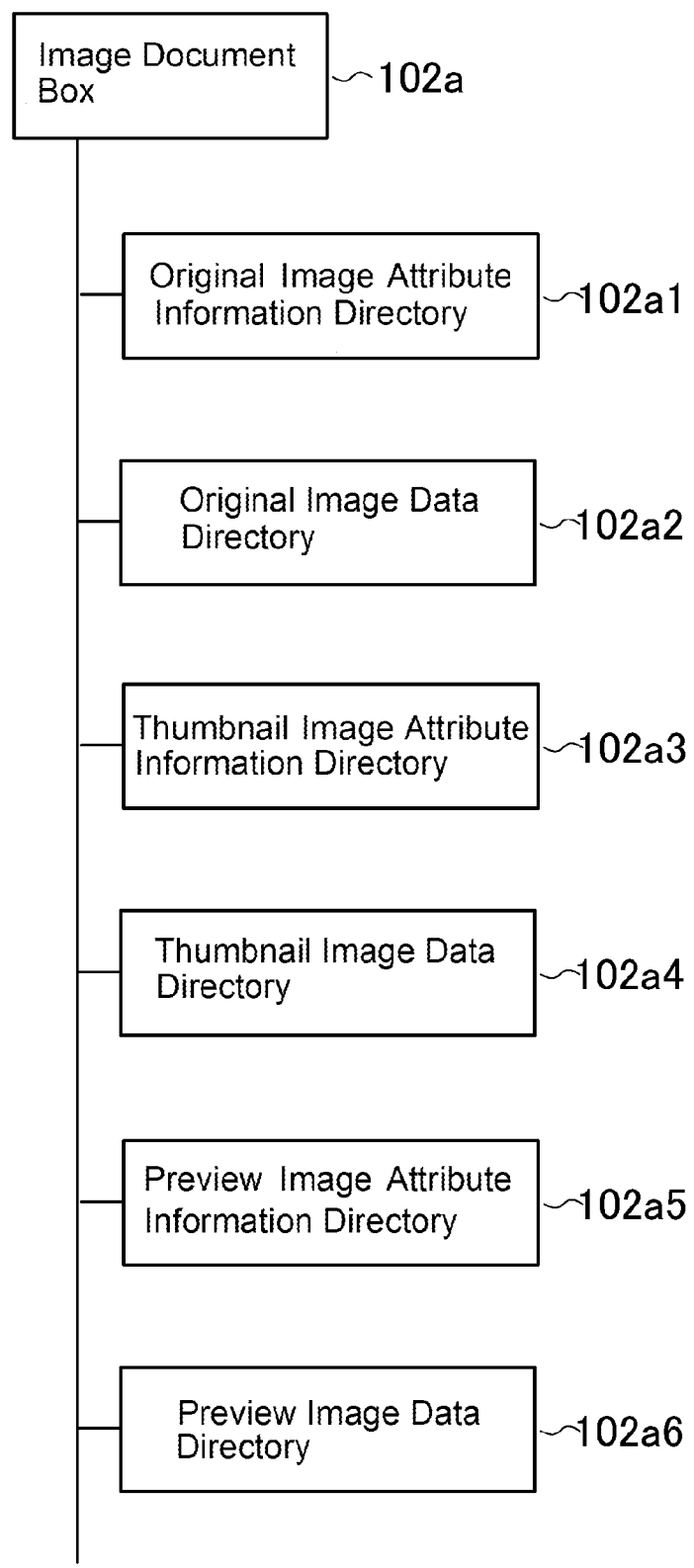
FIG. 2 illustrates a directory structure of an image document box according to the one embodiment.

The following describes a directory structure of the image document box 102a with reference to FIG. 2. The image document box 102a includes an original image attribute information directory 102a1, an original image data directory 102a2, a thumbnail image attribute information directory 102a3, a thumbnail image data directory 102a4, a preview image attribute information directory 102a5, and a preview image data directory 102a6. The original image attribute information directory 102a1 includes an image attribute information (hereinafter referred to as "original image attribute information") file created by the image processor 107. The original image data directory 102a2 includes an image data (hereinafter referred to as "original image data") file. The original image data file is created by the image processor 107 and stored by the image registration storage processor 101a. The thumbnail image attribute information directory 102a3 includes an image attribute information file of the thumbnail. The image attribute information file of the thumbnail is created from the original image attribute information upon request of creating a thumbnail image. The thumbnail image data directory 102a4 includes an image data file of the thumbnail. The image data file of the thumbnail is created from the original image data upon the request of creating the thumbnail image. The preview image attribute information directory 102a5 includes a preview image attribute information file. The preview image attribute information file is created from the original image attribute information upon the request of creating a preview image. The preview image data directory 102a6 includes a preview image data file. The preview image data file is created from the original document data upon a request of creating a preview image.

The following describes settings and processes until a blank sheet page image, which is created through scanning the blank sheet page of the document, is output to the image-log using FIG. 3. FIG. 3 lists items of "a document blank sheet page scan setting" k1, "a blank sheet page image registration setting" k2, "a blank sheet page image registration process" k3, "a blank sheet page image image-log output setting" k4, and "a blank sheet page image image-log output process" k5. The administrator sets items of "the document blank sheet page scan setting" k1, "the blank sheet page image registration setting" k2, and "the blank sheet page image image-log output setting" k4. The image forming apparatus 100 processes contents of "the blank sheet page image registration process" k3 and "the blank sheet page image image-log output process" k5.

"The document blank sheet page scan setting" k1 is a setting item of whether to leave the blank sheet page of the document as the image data or not when the blank sheet page is detected. To leave the blank sheet page of the document as the image data, "without skip scan function" is set, while not to leave the blank sheet page of the document as the image data, "with skip scan function" is set. The "blank sheet page image registration setting" k2 is a setting item of whether to register the blank sheet page image or not. To register the blank sheet page image, "with registration" is set, while not to register the blank sheet page image, "without registration" is set. When "with scan" is set to "the document blank sheet page scan setting" k1 and "with registration" is set to "the blank sheet page image registration setting" k2, upon detection of the blank sheet page image from the image on the scanned document, the "blank sheet page image registration process" k3 registers the blank sheet page image with the image attribute information and the image data. When "without skip scan function" is set to "the document blank sheet page scan setting" k1 and "without registration" is set to "the blank sheet page image registration setting" k2, upon detection of the blank sheet page image from the image on the scanned document, "the blank sheet page image registration process" k3 registers the blank sheet page image with the image attribute information but does not register the blank sheet page image with the image data. When "with skip scan function" is set to "the document blank sheet page scan setting" k1, since the blank sheet page of the document is not left as the image data, "the blank sheet page image registration process" k3 does not register the blank sheet page image with the image attribute information and the image data.

"The blank sheet page image image-log output setting" k4 is a setting item of whether or not to output the blank sheet page image to the image-log. To output the blank sheet page image to the image-log, "with output" is set, while not to output the blank sheet page image to the image-log, "without output" is set. Assume the case where "without skip scan function" is set to "the document blank sheet page scan setting" k1 and "with registration" is set to "the blank sheet page image registration setting" k2. When "with output" is set to "the blank sheet page image image-log output setting" k4, "the blank sheet page image image-log output process" k5 outputs an image including the blank sheet page image scanned from the document as the image-log. When "without output" is set to "the blank sheet page image image-log output setting" k4, "the blank sheet page image image-log output process" k5 outputs an image excluding the blank sheet page image as the image-log.

Assume the case where "without skip scan function" is set to "the document blank sheet page scan setting" k1 and "without registration" is set to "the blank sheet page image registration setting" k2. If "with output" is set to "the blank sheet page image image-log output setting" k4, "the blank sheet page image image-log output process" k5 outputs the image including the blank sheet page image created from the image attribute information as the image-log. If "without output" is set to "the blank sheet page image image-log output setting" k4, "the blank sheet page image image-log output process" k5 outputs the image excluding the blank sheet page image as the image-log. When "with skip scan function" is set to "the document blank sheet page scan setting" k1, since the blank sheet page of the document is not left as the image data, "the blank sheet page image image-log output process" k5 does not output the blank sheet page image as the image-log.

Figure 4A:
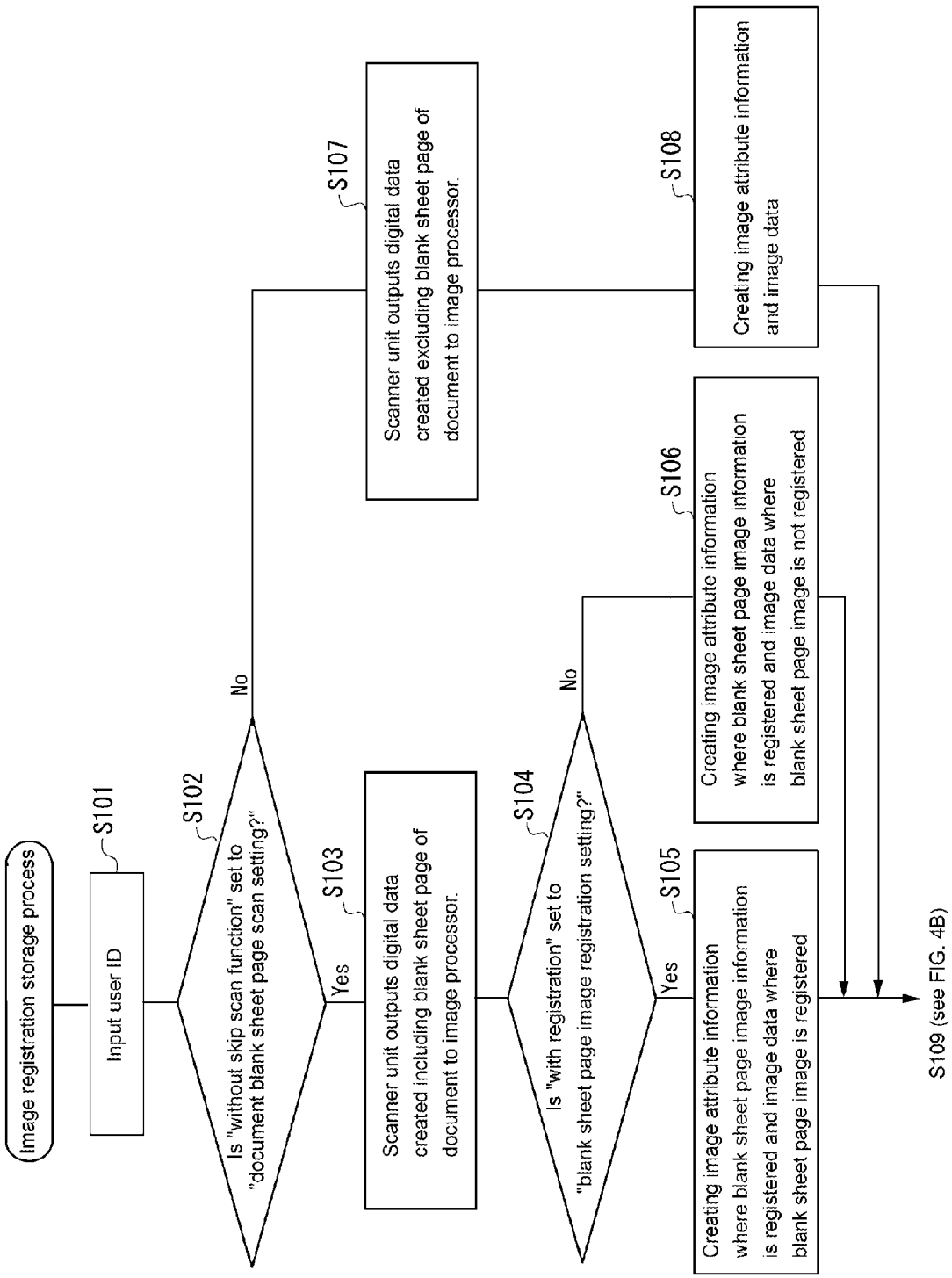
FIGS. 4A and 4B illustrate a flowchart of an image registration storage process according to the one embodiment.
Figure 4B:
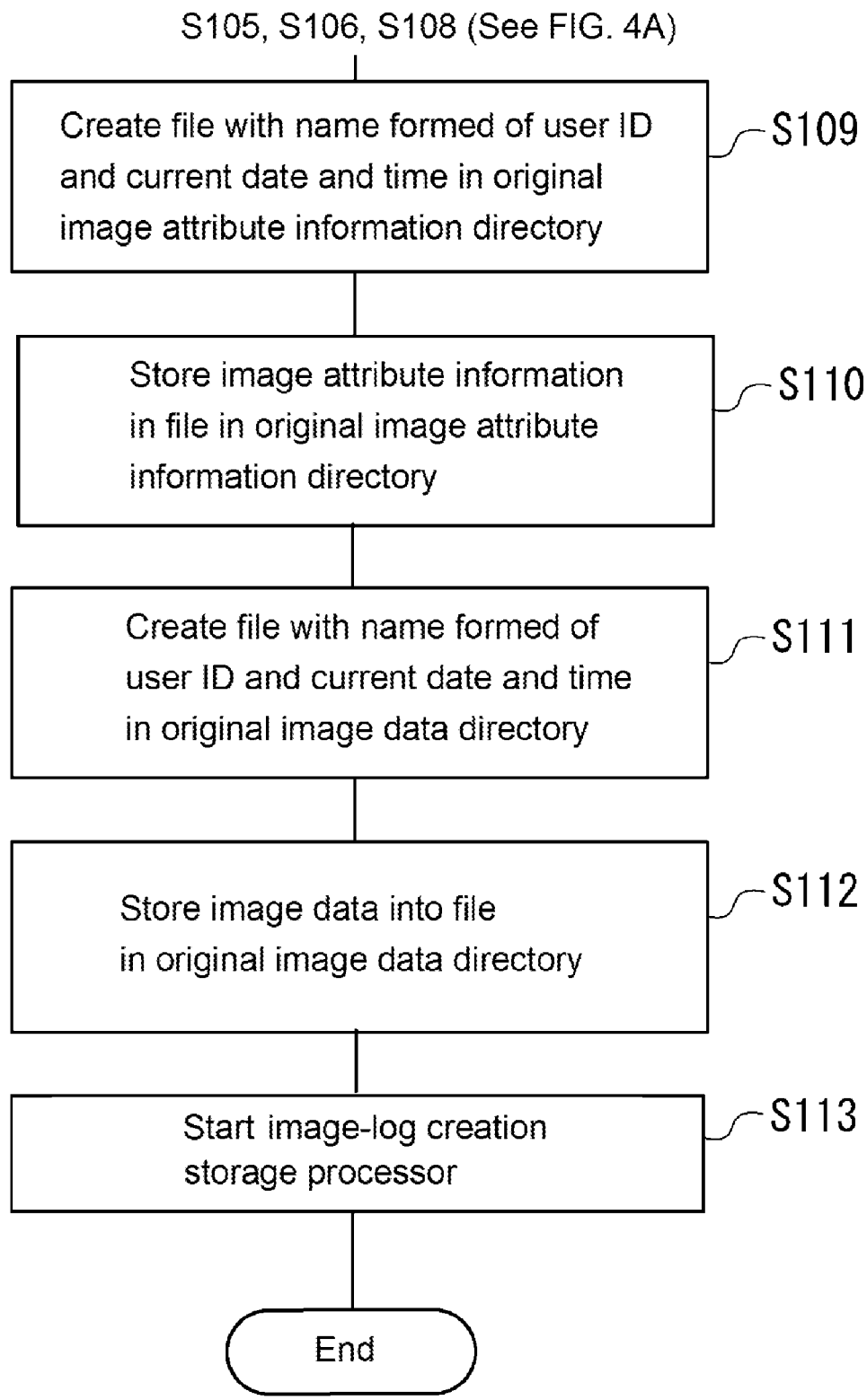

The following describes an image registration storage process performed by the image registration storage processor 101a of the image forming apparatus 100 according to the embodiment of the disclosure with reference to FIGS. 4A and 4B. When the user sets the document on the document platen, sets a user ID from the operation panel 104, sets "the document blank sheet page scan setting" k1, "the blank sheet page image registration setting" k2, and "the blank sheet page image image-log output setting" k4, and performs an image registration storage job execution request, the control unit 101 starts the image registration storage processor 101a. When the image registration storage processor 101a is started, the image registration storage processor 101a starts the image registration storage process. The following describes the image registration storage process in the order of the steps illustrated in FIGS. 4A and 4B.

Step S101

First, the image registration storage processor 101a inputs the user ID, which is set from the operation panel 104, from the operation panel processor 105.

Step S102

Next, when inputting "the document blank sheet page scan setting" k1, which is set from the operation panel 104, from the operation panel processor 105, the image registration storage processor 101a determines whether either of "without skip scan function" or "with skip scan function" is set. When "without skip scan function" is set (Yes at Step S102), the process proceeds to Step S103. When "with skip scan function" is set (No at Step S102), the process proceeds to Step S107.

Step S103

At Yes at Step S102, when the image registration storage processor 101a outputs a scan request of a scan setting including the blank sheet page of the document to the scanner unit 106, the scanner unit 106 outputs the digital data of the document created through scanning including the blank sheet page of the document set to the document platen to the image processor 107.

Step S104

Next, when inputting "the blank sheet page image registration setting" k2, which is set from the operation panel 104, from the operation panel processor 105, the image registration storage processor 101a determines whether either of "with registration" or "without registration" is set. When "with registration" is set (Yes at Step S104), the process proceeds to Step S105. When "without registration" is set (No at Step S104), the process proceeds to Step S106.

Step S105

At Yes at Step S104, when the image registration storage processor 101a outputs the image creation request with a setting to register the blank sheet page image to the image processor 107, the image processor 107 inputs the digital data of the document from the scanner unit 106. Next, upon detection of the blank sheet page from the digital data of the document, the image registration storage processor 101a creates the image attribute information where the blank sheet page image information is registered and the image data where the blank sheet page image is registered. Then, the process proceeds to Step S109.

Step S106

At No at Step S104, when the image registration storage processor 101a outputs a request not to register the blank sheet page image to the image processor 107, the image processor 107 inputs the digital data of the document from the scanner unit 106. Next, upon detection of the blank sheet page from the digital data of the document, the image registration storage processor 101a creates the image attribute information where the blank sheet page image information is registered and creates the image data where the blank sheet page image is not registered. Then, the process proceeds to Step S109.

Step S107

At No at Step S102, the image registration storage processor 101a outputs the scan request with the scan setting excluding the blank sheet page of the document to the scanner unit 106. Then, the scanner unit 106 outputs the digital data of the document, which is created through scanning excluding the blank sheet page of the document set on the document platen, to the image processor 107.

Step S108

Next, the image registration storage processor 101a outputs the image creation request to the image processor 107. The image processor 107 inputs the digital data of the document from the scanner unit 106. Thus, the image processor 107 creates the image attribute information and the image data.

Step S109

Next, the image registration storage processor 101a creates a file with a name formed of the user ID, which is input at Step S101, and a current date and time in the original image attribute information directory 102a1.

Step S110

Next, the image registration storage processor 101a stores the image attribute information, which is created at Step S105, Step S106, or Step S108, in the file of the original image attribute information directory 102a1. The file of the original image attribute information directory 102a1 is created at Step S109.

Step S111

Next, the image registration storage processor 101a creates a file with a name formed of the user ID, which is input at Step S101, and the current date and time in the original image data directory 102a2.

Step S112

Next, the image registration storage processor 101a stores the image data, which is created at Step S105, Step S106, or Step S108, into the file, which is created at Step S111, in the original image data directory 102a2.

Step S113

Next, the image registration storage processor 101a starts the image-log creation storage processor 101b and terminates the image registration storage process.

Figure 5A:
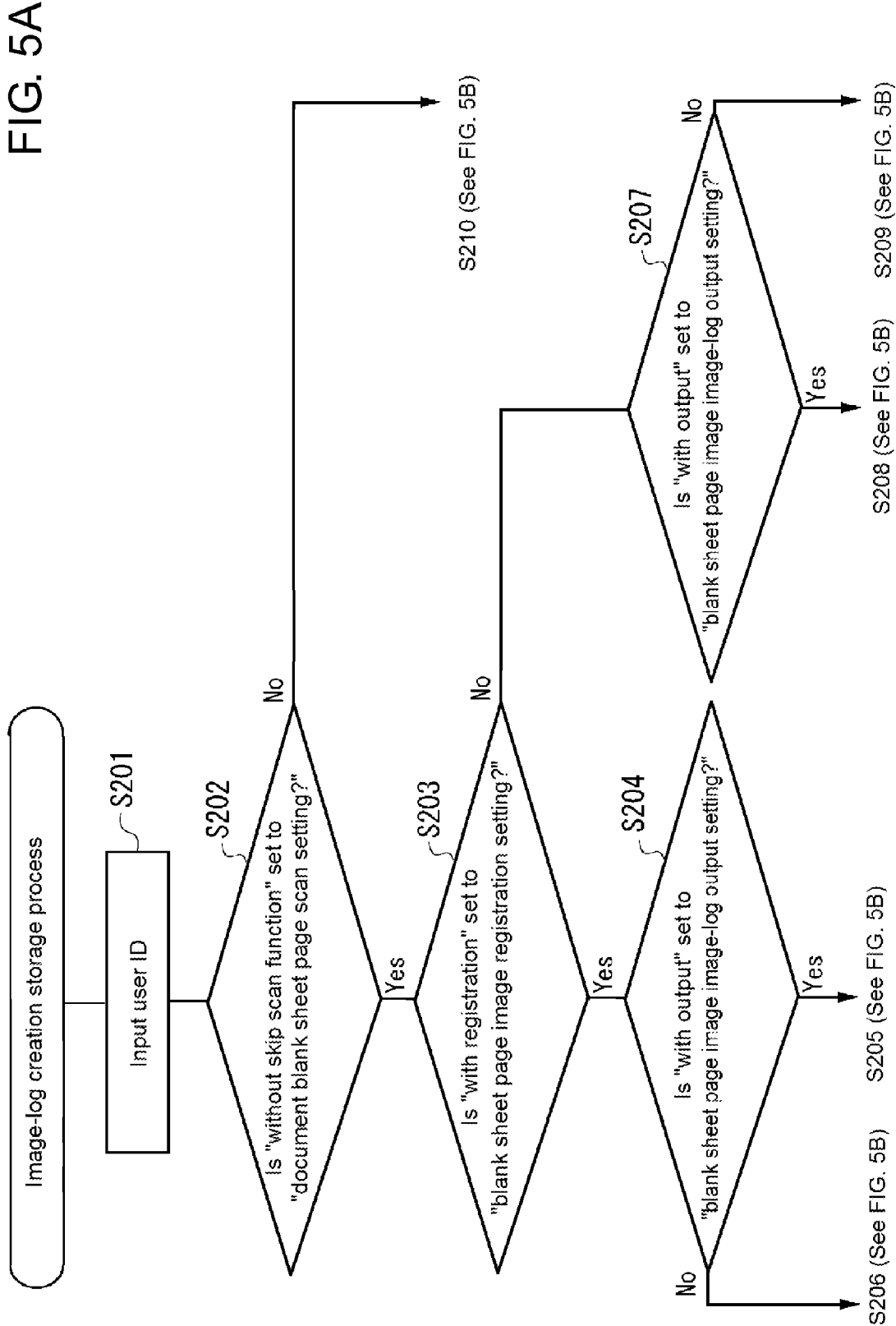

The following describes an image-log creation process performed by the image-log creation storage processor 101b of the image forming apparatus 100 according to the embodiment of the disclosure with reference to FIGS. 5A and 5B. When the image registration storage processor 101a starts the image-log creation storage processor 101b, the image-log creation storage processor 101b starts the image-log creation storage process. The following describes the image-log creation storage process in the order of the steps illustrated in FIGS. 5A and 5B.

Step S201

First, the image-log creation storage processor 101b inputs the user ID, which is set from the operation panel 104, from the operation panel processor 105.

Step S202

Next, when "the document blank sheet page scan setting" k1, which is set from the operation panel 104, is input from the operation panel processor 105, the image-log creation storage processor 101b determines either of whether "without skip scan function" or "with skip scan function" is set. When "without skip scan function" is set (Yes at Step S202), the process proceeds to Step S203. When "with skip scan function" is set, (No at Step 202), the process proceeds to Step S210.

Step S203

At Yes at Step S202, when inputting "the blank sheet page image registration setting" k2, which is set from the operation panel 104, from the operation panel processor 105, the image-log creation storage processor 101b determines whether either of "with registration" or "without registration" is set. When "with registration" is set (Yes at Step S203), the process proceeds to Step S204. When "without registration" is set (No at Step S203), the process proceeds to Step S207.

Step S204

At Yes at Step S203, when inputting "the blank sheet page image image-log output setting" k4, which is set from the operation panel 104, from the operation panel processor 105, the image-log creation storage processor 101b determines whether either of "with output" or "without output" is set. When "with output" is set (Yes at Step S204), the process proceeds to Step S205. When "without output" is set (No at Step S204), the process proceeds to Step S206.

Step S205

At Yes at Step S204, the image-log creation storage processor 101b creates the image-log of the images where the blank sheet page image scanned from the document is left as the image data. Then, the process proceeds to Step S211.

Step S206

At No at Step S204, the image-log creation storage processor 101b creates the image-log of the images excluding the blank sheet page image scanned from the document. Then, the process proceeds to Step S211.

Step S207

At No at Step S203, when inputting "the blank sheet page image image-log output setting" k4, which is set from the operation panel 104, from the operation panel processor 105, the image-log creation storage processor 101b determines whether either of "with output" or "without output" is set. When "with output" is set (Yes at Step S207), the process proceeds to Step S208. When "without output is set (No at Step S207), the process proceeds to Step S209.

Step S208

At Yes at Step S207, the image-log creation storage processor 101b creates the image-log of the images including the blank sheet page image, which is created from the image attribute information. Then, the process proceeds to Step S211.

Step S209

At No at Step S207, the image-log creation storage processor 101b creates the image-log of the images excluding the blank sheet page image. Then, the process proceeds to Step S211.

Step S210

At No at Step S202, the image-log creation storage processor 101b creates an image where the blank sheet page image is not left as the image data as the image-log. Then, the process proceeds to Step S211.

Step S211

Next, the image registration storage processor 101a creates a file with the name formed of the user ID, which is input at Step S201, and the current date and time in the image-log storage area 103a.

Step S212

Next, the image registration storage processor 101a stores the image-log, which is created at Step S205, Step S206, Step S208, Step S209, or Step S210, into the file, which is created at Step S211, in the image-log storage area 103a. Then, the image registration storage process is terminated.

As described above, only when the administrator has configured the setting to scan the blank sheet page of a document, the blank sheet page is scanned. Accordingly, when a setting not to perform scanning is configured, the blank sheet page is not scanned. The blank sheet page image is not registered with the image attribute information and the image data. This ensures saving a storage capacity. Assume the case where the administrator has configured the setting to scan the blank sheet page of the document. When a setting to register the blank sheet page image is configured, the blank sheet page image is registered with the image attribute information and the image data. When a setting not to register the blank sheet page image is configured, the blank sheet page image is not registered with the image data. This ensures saving the storage capacity.

Assume the case where the administrator has configured the setting to scan the blank sheet page of the document, the setting to register the blank sheet page image, and the setting to perform a blank sheet page image image-log output. This outputs the blank sheet page image of the scanned blank sheet page. Accordingly, the administrator can exactly confirm the number of blank sheet pages of the document. The administrator can also confirm whether the document regarded as the blank sheet page conceals confidential information or not. Further, when the setting not to perform the blank sheet page image image-log output is configured, the blank sheet page image of the scanned blank sheet page is not output. However, as necessary, the image-log of the images including the blank sheet page image of the scanned blank sheet page can be output.

Assume the case where the administrator has configured the setting to scan the blank sheet page of the document, the setting not to register the blank sheet page image, and the setting to perform the blank sheet page image image-log output. The blank sheet page image is created from the image attribute information and is output. Accordingly, the administrator can exactly confirm the number of blank sheet pages of the document. Further, when the setting not to perform the blank sheet page image image-log output is configured, the blank sheet page image is not created from the image attribute information and therefore is not output. However, as necessary, the image-log of the images including the blank sheet page image, which is created from the image attribute information, can be output.

The file in the image-log storage area 103a, which stores the image-log, is named formed of the user ID and the current date and time. Accordingly, when detecting the confidential information from the image-log, the user can be easily confirmed from the user ID. Additionally, the date and time when the image-log is created can be easily confirmed from the current date and time. Further, the file in the image document box 102a, which stores the image attribute information and the image data, is named formed of the user ID and the current date and time. This ensures easily determining the image attribute information and the image data corresponding to the image of the image-log.

In the embodiment, the image-log storage area 103a in the storage unit 103 of the image forming apparatus 100 stores the image-log of the images. This, however, should not be construed in a limiting sense. The image-log of the images can be transmitted to the management server or a file server (hereinafter referred to as an "external server") connected to the network 200, and an image-log storage area, which is arranged at the storage device such as a hard disk drive in the external server, can store the image-log of the images. Thus, transmitting the image-log of the images to the external server eliminates the need for arranging the image-log storage area 103a in the image forming apparatus 100. Setting "without registration" to the setting item of "the blank sheet page image registration setting" k2 does not cause the image data of the blank sheet page image to be stored in the image document box 102a. This further ensures saving the storage capacity.

The image attribute information, the image data, and the image-log are stored in the file with the name formed of the user ID and the current date and time. However, this should not be construed in a limiting sense. The user ID and the current date and time can be added to the beginning or the end of the image attribute information, the image data, and the image-log, and then the image attribute information, image data, and the image-log can be stored in the file.

When the user performs the scan request of the document, the user inputs the user ID from the operation panel 104 in the above-described embodiment. However, when the user further inputs a password, scanning of the document containing the confidential information by impersonation of the user of the user ID can be prevented.

The image forming apparatus and the image processing system of the disclosure can facilitate: the saving of the storage capacity of the image-log, confirmation of the number of pages of the blank sheet document by the image-log, and/or confirmation whether the blank sheet document conceals the confidential information or not.

The disclosure is described above with the specific embodiments; however, the above-described embodiments are examples of the disclosure, and it is needless to say that the disclosure is not limited to the embodiments.

The disclosure is preferable for an image forming apparatus and an image processing system; however, this should not be limited to the image forming apparatus and the image processing system. The disclosure is applicable to general apparatuses and systems that can store image data.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
   a user ID input unit that receives input of a user ID;
   a scanner unit for digitally scanning, into image data, documents set on a document platen of the image forming apparatus;
   an image document storage unit that stores the image data, and image attribute information as to attributes of the image data, the image attribute information including information as to image-data quality, resolution, size, rotational orientation, color, presence of blank sheet pages, and page numbers of blank sheet pages that are present;
   an image-log storage unit;
   an image-log creation unit for creating image logs from the image attribute information and the image data from documents scanned by the scanner unit, and storing the image logs in the image-log storage unit;
   a document blank sheet page skip scan function setting unit for setting whether the image forming apparatus skips scanning of blank sheet pages of documents set on the document platen, in a skip scan function whereby the scanner unit excludes blank sheet pages from the image data;
   a blank sheet page image registration setting unit that sets whether to record images of blank sheet pages among the scanned documents; and
   a blank sheet page image image-log output setting unit that sets whether to output image logs of blank sheet page images; wherein
   (i) the image forming apparatus, if "with registration" has been set by the blank sheet page image registration setting unit and "without skip scan function" has been set by the document blank sheet page skip scan function setting unit, stores in the image document storage unit image attribute information including blank sheet page images, and image data including blank sheet page images, wherein
  if "with output" has been set by the blank sheet page image image-log output setting unit, the image-log creation unit creates from the image data an image log including blank sheet page images, and the image forming apparatus stores the blank-sheet-page-image-including image log in the image-log storage unit, and
  if "without output" has been set by the blank sheet page image image-log output setting unit, the image-log creation unit creates from the image data including blank sheet page images an image log from which the blank sheet page images are excluded, and the image forming apparatus stores the blank-sheet-page-image-excluding image log in the image-log storage unit;
(ii) the image forming apparatus, if "without registration" has been set by the blank sheet page image registration setting unit and "without skip scan function" has been set by the document blank sheet page skip scan function setting unit, stores in the image document storage unit image attribute information including blank sheet page images, and image data from which the blank sheet page images are excluded, wherein
  if "with output" has been set by the blank sheet page image image-log output setting unit, the image-log creation unit creates an image log from the image data excluding the blank sheet page images, and the image forming apparatus stores the blank-sheet-page-image-excluding image log, and the image attribute information including the blank sheet page images, in the image-log storage unit, and
  if "without output" has been set by the blank sheet page image image-log output setting unit, the image-log creation unit creates an image log from the image data excluding the blank sheet page images, and the image forming apparatus stores the blank-sheet-page-image-excluding image log in the image-log storage unit;
(iii) the image forming apparatus, if "with skip scan function" has been set by the document blank sheet page skip scan function setting unit, stores in the image document storage unit image attribute information excluding blank sheet page images, and image data from which the blank sheet page images are excluded; and
(iv) the image forming apparatus adds the user ID and current date and time to either the beginning or the end of the image attribute information, the image data, and the image logs, and then causes the image attribute information and the image data to be stored in the image document storage unit, and the image logs to be stored in the image-log storage unit.

2. An image processing system comprising:
the image forming apparatus according to claim 1 connected to a network; and
an external server; wherein
the external server includes the image-log storage unit.

3. An image forming method by an image forming apparatus, comprising:
via a user ID input unit receiving input of a user ID;
via a scanner unit digitally scanning, into image data, documents set on a document platen of the image forming apparatus;
storing the image data and image attribute information as to attributes of the image data in an image document storage unit, the image attribute information including information as to image-data quality, resolution, size, rotational orientation, color, presence of blank sheet pages, and page numbers of blank sheet pages that are present;
creating image logs from the image attribute information and the image data from documents scanned by the scanner unit;
storing the image logs in an image-log storage unit;
setting, via a document blank sheet page skip scan function setting unit, whether the image forming apparatus skips scanning of blank sheet pages of documents set on the document platen, in a skip scan function whereby the scanner unit excludes blank sheet pages from the image data;
setting, via a blank sheet page image registration setting unit, whether to record images of blank sheet pages among the scanned documents; and
setting, via a blank sheet page image image-log output setting unit, whether to output image logs of blank sheet page images; wherein
(i) the image forming apparatus, if "with registration" has been set by the blank sheet page image registration setting unit and "without skip scan function" has been set by the document blank sheet page skip scan function setting unit, stores in the image document storage unit image attribute information including blank sheet page images, and image data including blank sheet page images, wherein
  if "with output" has been set by the blank sheet page image image-log output setting unit, the image-log creation unit creates from the image data an image log including blank sheet page images, and the image forming apparatus stores the blank-sheet-page-image-including image log in the image-log storage unit, and
  if "without output" has been set by the blank sheet page image image-log output setting unit, the image-log creation unit creates from the image data including blank sheet page images an image log from which the blank sheet page images are excluded, and the image forming apparatus stores the blank-sheet-page-image-excluding image log in the image-log storage unit;
(ii) the image forming apparatus, if "without registration" has been set by the blank sheet page image registration setting unit and "without skip scan function" has been set by the document blank sheet page skip scan function setting unit, stores in the image document storage unit image attribute information including blank sheet page images, and image data from which the blank sheet page images are excluded, wherein
  if "with output" has been set by the blank sheet page image image-log output setting unit, the image-log creation unit creates an image log from the image data excluding the blank sheet page images, and the image forming apparatus stores the blank-page-excluding image log, and the image attribute information including the blank sheet page images, in the image-log storage unit, and
  if "without output" has been set by the blank sheet page image image-log output setting unit, the image-log creation unit creates an image log from the image data excluding the blank sheet page images, and the image forming apparatus stores the blank-sheet-page-image-excluding image log in the image-log storage unit;

(iii) the image forming apparatus, if "with skip scan function" has been set by the document blank sheet page skip scan function setting unit, stores in the image document storage unit image attribute information excluding blank sheet page images, and image data from which the blank sheet page images are excluded; and (iv) the image forming apparatus adds the user ID and current date and time to either the beginning or the end of the image attribute information, the image data, and the image logs, and then causes the image attribute information and the image data to be stored in the image document storage unit, and the image logs to be stored in the image-log storage unit.

4. A non-transitory computer-readable recording medium storing an image forming program for an image forming apparatus including a user ID input unit for receiving input of a user ID, a scanner unit for digitally scanning, into image data, documents set on a document platen of the image forming apparatus, an image document storage unit for storing the image data and image attribute information of the image data, the image attribute information including information as to image-data quality, resolution, size, rotational orientation, color, presence of blank sheet pages, and page numbers of blank sheet pages that are present, and an image-log storage unit, the image forming program causing a computer to function as:

an image-log creation unit for creating image logs from image attribute information and image data from documents scanned by the scanner unit, and storing the image logs in the image-log storage unit;

a document blank sheet page skip scan function setting unit for setting whether the image forming apparatus skips scanning of blank sheet pages of documents set on the document platen, in a skip scan function whereby the scanner unit excludes blank sheet pages from the image data;

a blank sheet page image registration setting unit that sets whether to record images of blank sheet pages among the scanned documents; and a blank sheet page image image-log output setting unit that sets whether to output image logs blank sheet page images; wherein (i) the image forming apparatus, if "with registration" has been set by the blank sheet page image registration setting unit and "without skip scan function" has been set by the document blank sheet page skip scan function setting unit, stores in the image document storage unit image attribute information including blank sheet page images, and image data including blank sheet page images, wherein if "with output" has been set by the blank sheet page image image-log output setting unit, the image-log creation unit creates from the image data an image log including blank sheet page images, and the image forming apparatus stores the blank-sheet-page-image-including image log in the image-log storage unit, and if "without output" has been set by the blank sheet page image image-log output setting unit, the image-log creation unit creates from the image data including blank sheet page images an image log from which the blank sheet page images are excluded, and the image forming apparatus stores the blank-sheet-page-image-excluding image log in the image-log storage unit;

(ii) the image forming apparatus, if "without registration" has been set by the blank sheet page image registration setting unit and "without skip scan function" has been set by the document blank sheet page skip scan function setting unit, stores in the image document storage unit image attribute information including blank sheet page images, and image data from which the blank sheet page images are excluded, wherein if "with output" has been set by the blank sheet page image image-log output setting unit, the image-log creation unit creates an image log from the image data excluding the blank sheet page images, and the image forming apparatus stores the blank-page-excluding image log, and the image attribute information including the blank sheet page images, in the image-log storage unit, and if "without output" has been set by the blank sheet page image image-log output setting unit, the image-log creation unit creates an image log from the image data excluding the blank sheet page images, and the image forming apparatus stores the blank-sheet-page-image-excluding image log in the image-log storage unit;

(iii) the image forming apparatus, if "with skip scan function" has been set by the document blank sheet page skip scan function setting unit, stores in the image document storage unit image attribute information excluding blank sheet page images, and image data from which the blank sheet page images are excluded; and (iii) the image forming apparatus adds the user ID and current date and time to either the beginning or the end of the image attribute information, the image data, and the image logs, and then causes the image attribute information and the image data to be stored in the image document storage unit, and the image logs to be stored in the image-log storage unit.

* * * * *